United States Patent [19]
Cachuela et al.

[11] 3,967,103
[45] June 29, 1976

[54] DECODER/ANALYZER TEST UNIT

[75] Inventors: Lawrence P. Cachuela, Westminster; George G. Sanford, Jr., Diamond Bar, both of Calif.

[73] Assignee: McDonnell Douglas Corporation, Long Beach, Calif.

[22] Filed: Apr. 14, 1975

[21] Appl. No.: 567,747

[52] U.S. Cl. .................. 235/153 AC; 235/153 AK; 324/73 R
[51] Int. Cl.² ........................................ G06F 11/04
[58] Field of Search ............... 235/153 AC, 153 AK, 235/150.2; 340/172.5; 324/73 R; 244/77 R, 77 M

[56] References Cited
UNITED STATES PATENTS

| | | | |
|---|---|---|---|
| 3,609,312 | 9/1971 | Higgins et al. | 235/153 AC |
| 3,657,527 | 4/1972 | Kassaggi et al. | 235/153 AC |
| 3,678,256 | 7/1972 | Harenberg, Jr. | 244/77 M |
| 3,829,842 | 8/1974 | Langdon et al. | 235/153 AK |
| 3,831,148 | 8/1974 | Greenwald et al. | 340/172.5 |

*Primary Examiner*—Charles E. Atkinson
*Attorney, Agent, or Firm*—D. N. Jeu; Walter J. Jason; Donald L. Royer

[57] ABSTRACT

A decoder/analyzer test unit capable of rapidly identifying and isolating a failure or fault detected during a sequence of numerous discrete tests of a digital computer in an aircraft flight guidance system is disclosed. The test unit broadly comprises a means for comparing for coincidence of a signal representing a satisfactory result of a discrete test of a computer during a test sequence and another signal that initiated the particular discrete test, means for stopping the computer test sequencing when there is a lack of coincidence of the compared signals for any particular discrete test, and step counter means for counting and indicating the particular test that the computer is undergoing. Test points connecting with identified connections in the computer under test are provided on the test unit for troubleshooting purposes. The test unit can be operated in automatic, continuous and manual modes of operation.

10 Claims, 6 Drawing Figures

DECODER/ANALYZER TEST UNIT

BACKGROUND OF THE INVENTION

Our present invention pertains generally to the field of test equipment. More particularly, the invention relates to a decoder/analyzer test unit for enabling the rapid identification and isolation of failures or faults detected during various tests of a digital computer.

Large modern aircraft generally carry a flight guidance system which utilizes digital computers therein. The DC-10 aircraft, for example, employs a Bendix PB-100 Flight Guidance System that includes pitch, roll and yaw computers which have built in test equipment (BITE) for testing the computers. Each of the computers can be subjected by such built in test equipment to a sequence of discrete tests to determine if the computer under test is in good working order.

There are, however, a relatively large number of discrete tests that are performed in each of the different sequences of tests for the three computers and, when there is a failure in any of the discrete tests of a computer, the computer merely indicates a "no-go" condition thereof. An identification of the particular test or tests failed by the computer and the approximate or specific location of the fault therein are not provided by such computer. Thus, a faulty computer must be removed from its aircraft and long manhours are then required in further testing and troubleshooting of the computer.

SUMMARY OF THE INVENTION

Briefly, and in general terms, our invention is preferably accomplished by providing a decoder/analyzer test unit including a means for comparing for coincidence of a satisfactory discrete test (System Fail Enabled) signal of a test sequence from a computer under test and the particular discrete test initiating (Step Counter Clock) signal therefrom, means for stopping the sequence of tests upon a lack of coincidence of the System Fail Enabled and Step Counter Clock signals for any particular discrete test in the sequence, and step counter means responsive to the Step Counter Clock signals for counting and indicating the particular discrete test that the computer is undergoing. A Test Stop signal is produced by the test unit to the computer under test when there is a lack of coincidence of the System Fail Enabled and Step Counter Clock signals. This would occur, for example, when there is a failure of a discrete test and a System Fail Enabled signal is not produced from the computer in response to the corresponding Step Counter Clock signal.

The test unit preferably includes means for producing a shortened duration signal from the Step Counter Clock signal and delaying it for a predetermined period to insure that the shortened and delayed signal will fall properly within the duration that the System Fail Enabled signal coincides with the Step Counter Clock signal. The test unit also includes means for inhibiting certain computer control (Group Skip) signals associated with the Step Counter Clock signals from affecting correct operation of the decoder/analyzer test unit. Data, clock and fail monitors which can be light emitting diodes (LEDs) are included to indicate the existence of System Fail Enabled, Step Counter Clock and Test Stop signals, respectively, to or from the test unit.

The decoder/analyzer test unit is selectively connected by the connectors of, for example, two cables to the pitch, roll or yaw computer. Two sets of taper pin blocks corresponding respectively to the two cable connectors are provided on the test unit. All pins on each of the two connectors are brought out to test points identified by corresponding pin numbers at the two sets of taper pin blocks for troubleshooting purposes. Certain of the test points at the taper pin blocks are connected into the test unit through a computer selector switch. This computer selector switch can be positioned to pitch, roll or yaw computer positions in accordance with the connection of a pitch, roll or yaw computer to the test unit so that the proper connector pins for the different computers are connected to the test unit.

A test mode selector switch is provided on the test unit and can be positioned for three different modes of operation thereof. These modes of operation are identified as "Stop On Failure," "Continuous Step Count" and "Manual Increment." There are also three pushbutton switches respectively identified as "Fail Reset/Step Increment," "Fast Advance" and "Counter Reset" provided on the test unit. In the first mode of operation of the test unit, the step counter means thereof and the sequence of discrete tests in the connected computer are automatically stopped when a failure occurs and there is no coincidence of the System Fail Enabled and Step Counter Clock signals for the corresponding discrete test. The number of the discrete test which failed is displayed by the step counter means. The number of the failure can be noted and the test sequencing continued by momentarily depressing the "Fail Reset/Step Increment" pushbutton switch or the trouble can be isolated using the test points on the two sets of taper pin blocks and corrected before continuing the sequencing.

In the second mode of operation of the test unit, the step counter means and computer test sequencing are continued through any discrete test failure without stopping. In this instance, the data, clock and fail monitors, and step counter means display, are used for visual observation of the behavior of the computer under test. In the third mode of operation of the test unit, computer test sequencing can be stepped through manually as desired with the "Fail Reset/Step Increment" pushbutton switch. The "Fast Advance" pushbutton switch can be used to speed up the sequencing of the computer discrete tests, and the "Counter Reset" pushbutton switch can be used to reset the step counter means to a zero display or indication.

BRIEF DESCRIPTION OF THE DRAWINGS

Our invention will be more fully understood, and other advantages and features thereof will become apparent, from the following description of an exemplary embodiment of the invention. The description is to be taken in conjunction with the accompanying drawings, in which:

FIG. 3 is a circuit diagram of a major portion of the decoder/analyzer test unit;

DESCRIPTION OF THE PRESENT EMBODIMENT

In the following description and accompanying drawings of an illustrative embodiment of our invention, some specific values and types of components are disclosed. It is to be understood, of course, that such values and types of components are given as examples only and are not intended to limit the scope of the invention in any manner.

Figure 1:
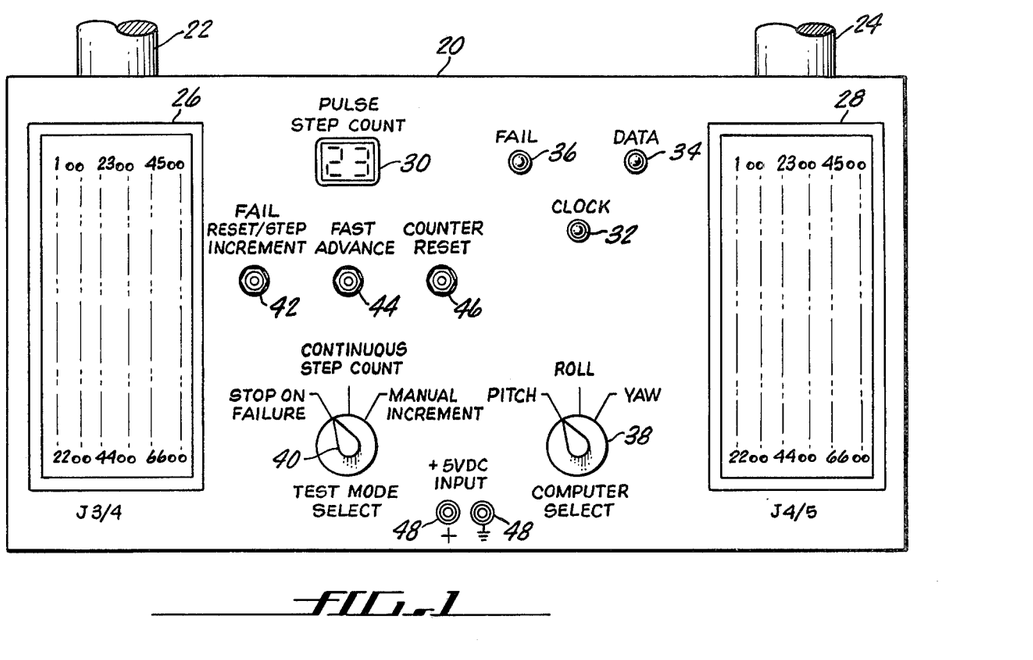
FIG. 1 is a front elevational view of a decoder/analyzer test unit constructed according to this invention.

FIG. 1 is a front elevational view of an illustrative embodiment of a decoder/analyzer test unit 20 constructed according to this invention. The decoder/analyzer 20 includes two cables 22 and 24 with respective end connectors (not shown) which can be connected to a pitch, roll or yaw computer, two sets 26 and 28 of taper pin blocks corresponding respectively to the cables 22 and 24, a two-digit light emitting diode (LED) readout counter means 30, LED monitors 32, 34 and 36, computer selector switch 38, test mode selector switch 40, step increment (fail reset) pushbutton switch 42, fast advance pushbutton switch 44, counter reset pushbutton switch 46, and +5 volts d-c input terminals 48. The exemplary embodiment of the decoder/analyzer 20 shown can, of course, be modified in its arrangement of components or varied in configuration without affecting the principles of this invention.

The end connectors of the cables 22 and 24 are labeled J3/4 and J4/5, respectively, as are the two sets 26 and 28 of corresponding taper pin blocks. The end connectors labeled J3/4 and J4/5 of the cables 22 and 24 can be connected to respective receptacles labeled J3 and J4 (not shown) of a yaw computer or to respective receptacles labeled J4 and J5 (also not shown) of either a roll or pitch computer. All pins on each of the two end connectors of the cables 22 and 24 are brought out to test points identified by corresponding pin numbers at the two sets 26 and 28 of taper pin blocks. Thus, a "break-out" of each of the connector pins on the end connectors of the cables 22 and 24 is provided as a troubleshooting aid when a fault occurs in a connected computer during a sequence of discrete tests thereof.

Counter means 30 is a step counter providing a two-digit readout display which is labeled "PULSE STEP COUNT." This numeric display indicates which computer built in test equipment (BITE) discrete test of a sequence is in process. The LED monitors 32, 34 and 36 are respectively labeled "CLOCK," "DATA" and "FAIL." These monitors 32, 34 and 36 are provided to give a visual indication of the more important signals occurring in the decoder/analyzer 20. These signals are pulse signals referred to herein as the Step Counter Clock (CLOCK), System Fail Enabled (DATA) and Test Stop (FAIL) signals.

The computer selector switch 38 is a three-position rotary switch which can be set to positions labeled "PITCH," "ROLL" and "YAW" corresponding to the pitch, roll and yaw computers associated with, for example, the Bendix PB-100 Flight Guidance System used on the DC-10 aircraft. This selector switch 38 is used to connect the desired inputs and outputs of the decoder/analyzer 20 with the selected pitch, roll or yaw computer which each undergoes its own particular sequence of discrete tests.

The test mode selector switch 40 is also a three-position rotary switch which can be set to positions labeled "STOP ON FAILURE," "CONTINUOUS STEP COUNT" and "MANUAL INCREMENT." In the first position, the decoder/analyzer 20 functions to stop the counter means 30 and the computer test sequence when a coincidence of the Step Counter Clock and System Fail Enabled pulses from the computer under test does not occur. The number of the failed test will appear on the counter means 30.

In the second position, the decoder/analyzer 20 functions to continue the counter means 30 and the computer test sequence through failures. The LED monitors 32, 34 and 36 and counter means 30 display are used for visual observation of computer performance in this test mode. Both clock and fail monitors 32 and 36 should flash at each failed discrete test step as its number is displayed on the counter means 30. In the third position, the decoder/analyzer 20 functions to permit manual increments or stepping of the tests one step at a time by momentarily depressing the fail reset/step increment pushbutton switch 42.

Fail reset/step increment switch 42 can be momentarily depressed to reset a flip-flop component in the decoder/analyzer 20. This is done at the beginning of a test sequence or following a failure indication to resume test sequencing. The fast advance switch 44 can be depressed to speed up the sequencing of the discrete tests in the computer. The counter reset switch 46 can be momentarily depressed to reset the counter means 30 to zero. This is normally done initially at the beginning of a test sequence.

In testing aircraft computers of the so-called wire separated form wherein computer channels are completely separated as a safety precaution, +5 volts d-c is obtained from the computer under test itself and is switched in to the decoder/analyzer 20 through the computer selector switch 38. A battery or regulated power supply is, however, required when testing aircraft computers which are not wire separated. In this instance, the battery or power supply is connected to input terminals 48 to provide +5 volts d-c to the decoder/analyzer 20. The positive terminal of the input terminals 48 is connected by an isolating diode to the various components in the decoder/analyzer 20, and the ground terminal is connected to a suitable ground point therein.

Figure 2:
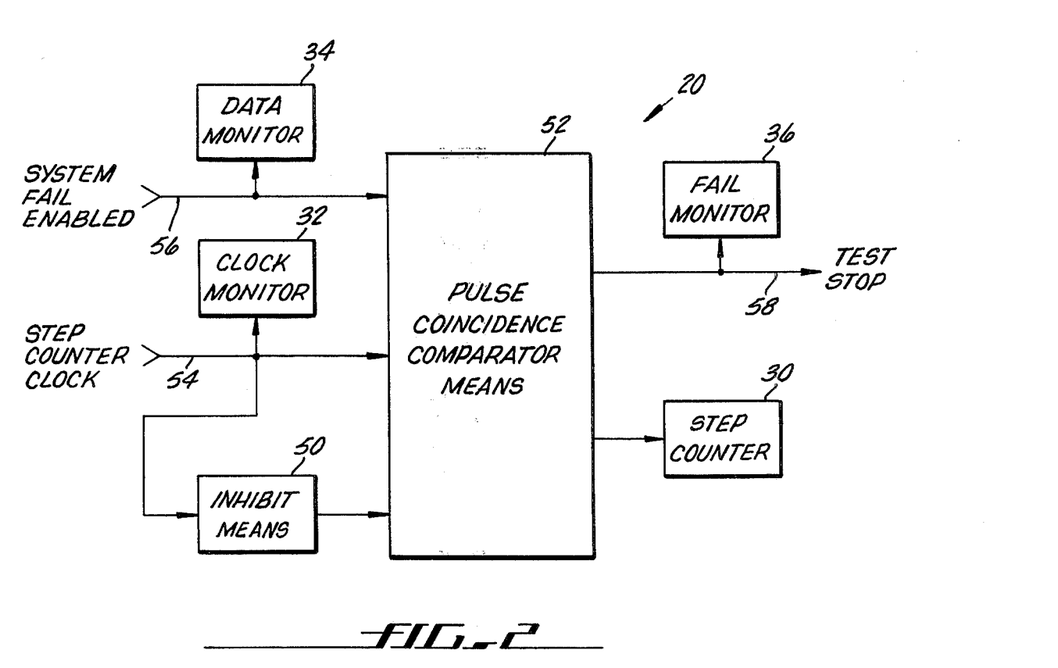
FIG. 2 is a broadly shown block diagram of the decoder/analyzer test unit.

FIG. 2 is a block diagram of the decoder/analyzer test unit 20. The test unit 20 is broadly shown to include step counter means 30, clock, data and fail monitors 32, 34 and 36, inhibit means 50, and pulse coincidence comparator means 52. The Step Counter Clock and System Fail Enabled signals from the computer under test are applied to the comparator means 52 respectively on leads 54 and 56 as indicated. Each Step Counter Clock pulse initiates a discrete test of a sequence in the computer under test and a corresponding System Fail Enabled pulse is produced by the computer if its response is satisfactory.

The Step Counter Clock pulse is shortened and delayed for a slight predetermined period in the comparator means 52 and compared for coincidence with the simultaneously overlapping duration of the Step Counter Clock and System Fail Enabled pulses. When the computer response is unsatisfactory, this corresponding System Fail Enabled pulse is not produced by the computer and, consequently, there is a lack of pulse coincidence. A Test Stop output signal is then provided by the comparator means 52 on lead 58 to the computer to halt further test sequencing therein.

The clock and data LED monitors 32 and 34 are respectively energized during the existence of the Step Counter Clock and System Fail Enabled pulses to the comparator means 52. The fail LED monitor 36 is energized when a Test Stop signal is being provided from the comparator means 52 to the computer under test. The step counter means 30 is stepped in response to each delayed Step Counter Clock pulse from the comparator means and, thus, displays the number of the discrete test of a sequence that the computer is undergoing. Of course, when there is a failure in computer response to a discrete test, the number of such test is displayed by the step counter means 30 until test sequencing is resumed.

The Step Counter Clock pulses are arranged in groups (GC-1, GC-2, GC-3, etc.) of pulses and certain computer control (Group Skip) pulses are associated with each group. These Group Skip pulses can erroneously affect the operation of the decoder/analyzer test unit 20. The inhibit means 50 is responsive to each Step Counter Clock pulse and produces an output signal to the comparator means 52. This output signal inhibits any response of the test unit 20 to any of the Group Skip pulses so that correct operation of the test unit is preserved.

FIG. 3 is a circuit diagram of the major portion of the decoder/analyzer 20. The Step Counter Clock signal from the computer under test is provided on lead 54 to pin 2 of a nand gate 60. The System Fail Enabled signal from the computer under test is provided on lead 56 through position 1 of test mode switch 40a to pin 1 of the nand gate 60. Position 1 is the "STOP ON FAILURE" setting of the test mode selector switch 40. Output pin 3 of nand gate 60 is connected to pin 1 of a JK type flip-flop 62. Pin 4 of the flip-flop 62 is connected to ground. The lead 56 is also connected to pins 11 and 12 of nor gate 64, and the output pin 13 thereof is connected to data LED monitor 34 which is connected by resistance R1 to +5 volts d-c. The nor gate 64 is essentially connected as an inverter and, when the System Fail Enabled signal is high in potential, the data monitor 34 is energized to emit light.

The lead 54 is also connected by a diode 66 to test mode switch 40b. The clear or reset pin 13 of the flip-flop 62 is connected to the diode 66 when the test mode switch 40b is placed in its position 2. Position 2 is the "CONTINUOUS STEP COUNT" setting of the test mode selector switch 40. In this position, the reset pin 13 of the flip-flop 62 is connected through test mode switch 40b and series blocking diode 66 to the lead 54 which is at a low ground potential when the Step Counter Clock pulse is not present on the lead. Thus, the flip-flop 62 is automatically reset after each Step Counter Clock pulse when the test mode selector switch 40 is placed in its position 2 for a continuous step count mode of operation.

The lead 54 is further connected by diode 68 to pin 12 of nand gate 70, pin 4 of the nand gate 72, and pins 8 and 9 of nor gate 74. The anode of the diode 68 is connected through resistance R2 to +5 volts d-c. Pin 4 of the nand gate 72 is also connected by diode 76 to output pin 1 of one-shot multivibrator 78. Pin 5 of the nand gate 72 is connected directly to the output pin 1 of the one-shot 78. Output pin 10 of the nor gate 74 is connected to pins 2 and 3 of nor gate 80 and its output pin 1 is, in turn, connected to pins 5 and 6 of nor gate 82. The output pin 4 of the nor gate 82 is connected to input pin 5 of the one-shot 78. The buffer nor gates 80 and 82 and the one-shot 78 essentially comprise the inhibit means 50 (FIG. 2).

The output pin 10 of the nor gate 74 is also connected to clock LED monitor 32 which is connected by resistance R3 to +5 volts d-c. This +5 volts d-c is connected to another resistance R4 which is connected with a capacitance C1. The resistance R4 is connected between pins 14 and 11 of the one-shot 78, and the capacitance C1 is connected between pins 11 and 10 thereof. When a Step Counter Clock pulse appears on lead 54, the diode 68 stops conducting and a high input signal is provided to nor gate 74. This high signal is successively inverted by the nor gates 74, 80 and 82 and applied as a low signal without effect to the one-shot 78. This low signal, however, goes high at the end of the Step Counter Clock pulse and triggers the one-shot 78 so that the normally high signal at output pin 1 thereof becomes low for a duration determined by the values of resistance R4 and capacitance C1. When the normally high signal at output pin 1 of the one-shot 78 goes low, the pin 12 of nand gate 70 and pins 4 and 5 of nand gate 72 also become low in potential.

Output pin 6 of the nand gate 72 is connected through resistance R5 to pin 13 of nand gate 70. A capacitance C2 connects the pin 13 of nand gate 70 to ground. The output signal from pin 6 of nand gate 72 is thus delayed in accordance with the time constant established by the resistance R5 and capacitance C2. Output pin 11 of the nand gate 70 is also connected through a resistance R6 to pins 9 and 10 of a nand gate 84. A capacitance C3 connects the pins 9 and 10 of nand gate 84 to ground. The resistance R6 and capacitance C3 also delays the output signal from pin 11 of the nand gate 70. Output pin 8 of the nand gate 84 is connected directly to pin 12 of flip-flop 62 and pin 15 of the units stage 30a of step counter means 30, and to ground through capacitance C4. The carry or maximum count pin 7 of the units stage 30a is connected to pin 15 of the tens stage 30b of the step counter 30. Nand gates 60, 70, 72 and 84 and flip-flop 62 essentially comprise the comparator means 52 (FIG. 2).

Output pin 2 of flip-flop 62 is connected to test mode switch 40c, and to 5 volts d-c through fail LED monitor 36 in series with resistance R7. The test mode switch 40c is connected to Test Stop lead 58 when placed in switch positions 1 or 3. Position 3 is the "MANUAL INCREMENT" setting of the test mode selector switch 40. A low signal from output pin 2 of flip-flop 62 provided on lead 58 stops the computer test sequence and also energizes fail monitor 36. Clear or reset pin 13 can be grounded through fail reset/step increment pushbutton switch 42. Depressing the fail reset/step increment switch 42 resets the flip-flop 62 so that a high signal is obtained on output pin 2 of the flip-flop and provided on lead 58 to cause resumption of computer test sequencing. A Fast Advance lead 86 can be grounded through fast advance pushbutton switch 44. Depressing the fast advance switch 44 produces rapid sequencing of the computer discrete tests. Counter reset pushbutton switch 46 can be depressed to ground clear pin 12 of the counter stages 30a and 30b to reset the step counter 30 to zero.

Figure 4:
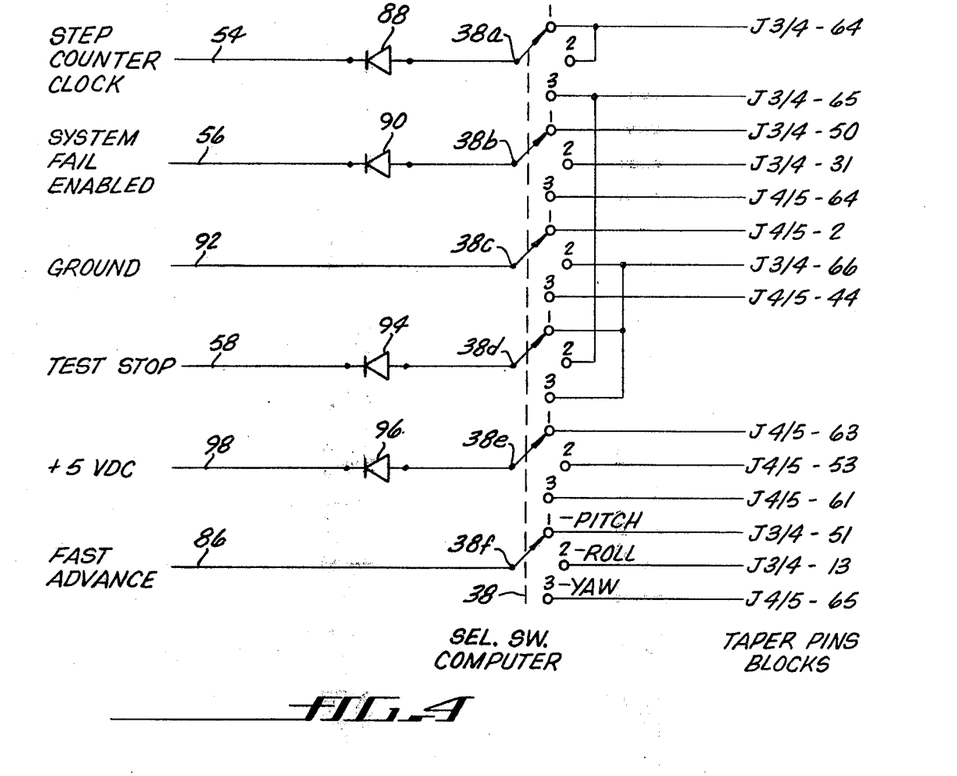
FIG. 4 is a circuit diagram of the remaining portion of the decoder/analyzer test unit.

FIG. 4 is a circuit diagram of the remaining portion of the decoder/analyzer test unit 20. The contacts of the three position computer selector switch 38 connect with certain pins in the two sets 26 and 28 (FIG. 1) of taper pin blocks as indicated. Some of the contacts are connected together as shown in FIG. 4. It may be noted that each pin number has two available and electrically tied test point openings (FIG. 1) adjacent to the pin number for suitable access thereto. Computer selector switch 38a is connected by diode 88 to step counter clock lead 54, and switch 38b is connected by diode 90 to system fail enabled lead 56. Switch 38c is connected to ground lead 92, switch 38d is connected by diode 94 to test stop lead 58, switch 38e is connected by diode 96 to 5 volts d-c lead 98, and switch 38f is connected to fast advance lead 86. The lead 92 is connected to a suitable ground connection in the decoder/analyzer 20, and the lead 98 supplies computer power to the components therein.

Figure 5:
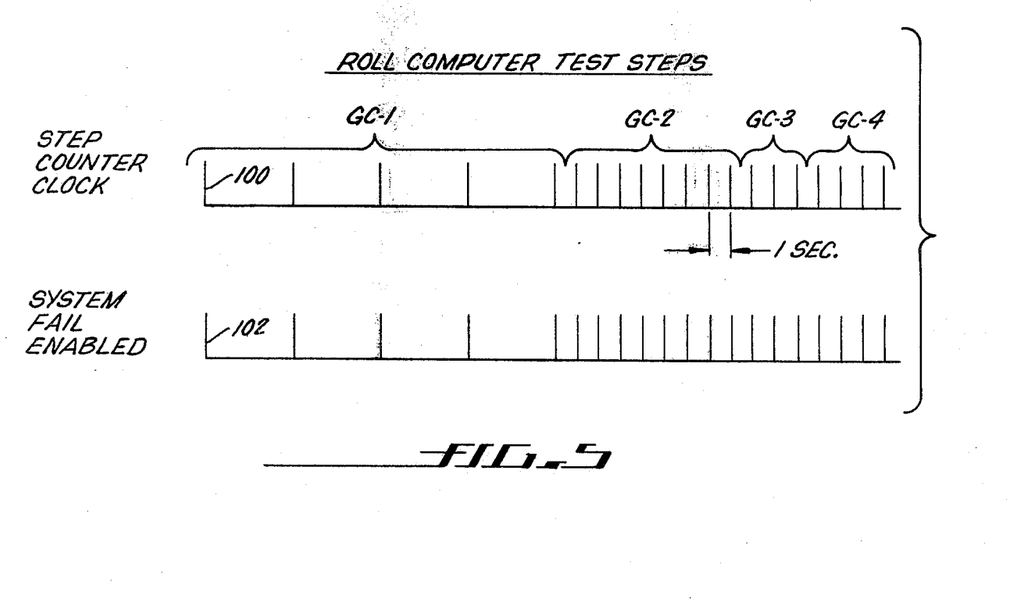
FIG. 5 is a graph showing illustrative plots of a sequence of (Step Counter Clock) signals initiating discrete tests in a roll computer and the corresponding sequence of (System Fail Enabled) signals indicating satisfactory computer responses to the discrete tests.

FIG. 5 is a graph showing illustrative plots of part of a sequence of the Step Counter Clock pulses 100 initiating discrete tests in a roll computer and the corresponding part of a sequence of System Fail Enabled pulses 102 indicating satisfactory computer responses to the discrete tests. These sequences of pulses 100 and 102 are provided respectively on the step counter clock lead 54 and system fail enabled lead 56 (FIGS. 2, 3 and 4). The Step Counter Clock pulses 100 are arranged in groups GC-1, GC-2, GC-3, GC-4, etc. At the end of each group of these pulses 100, there are three computer control Group Skip pulses associated with each group. As mentioned previously, these Group Skip pulses can erroneously affect the operation of the decoder/analyzer 20 and the inhibit means 50 (FIG. 2) are provided to prevent any response of the decoder/analyzer to such Group Skip pulses. The Group Skip pulses are much shorter than the Step Counter Clock pulses 100 and are not visible in FIG. 5.

Figure 6:
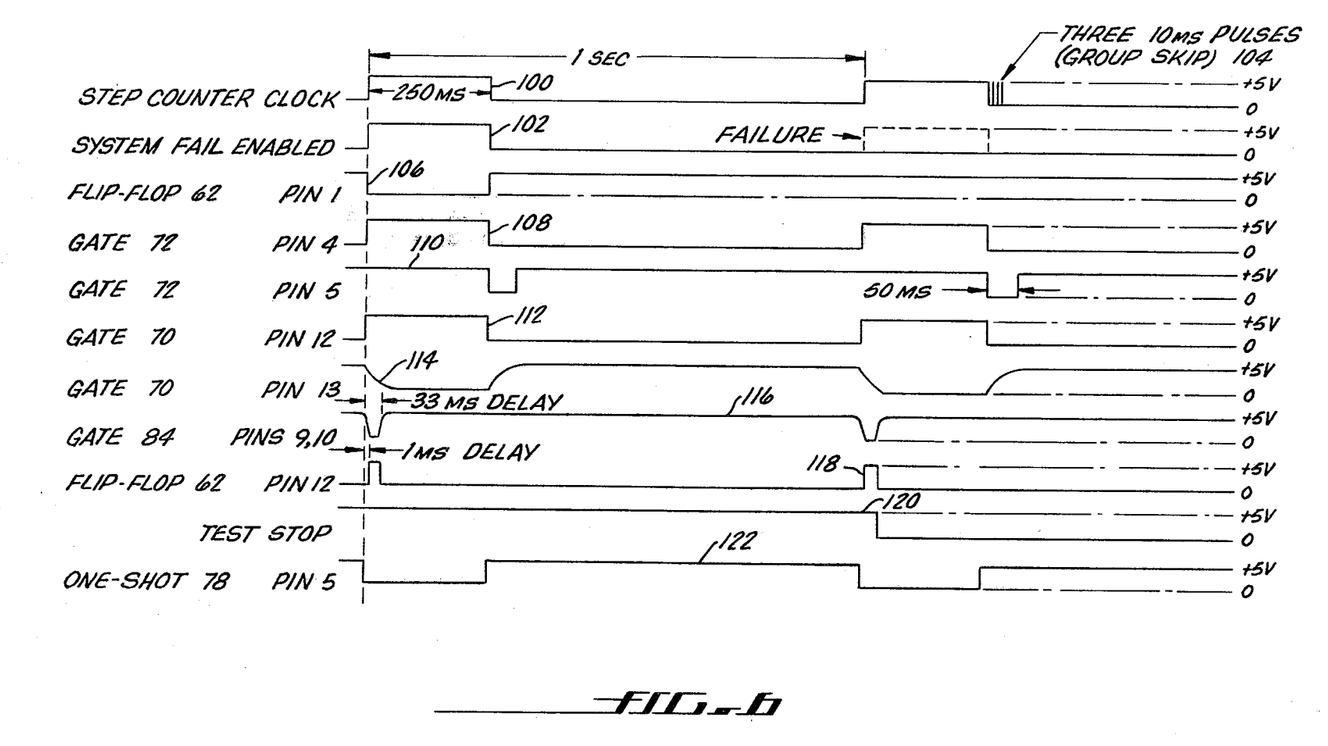
FIG. 6 is another graph showing plots of several signals applied to and produced in the decoder/analyzer test unit during a test sequence in which a failure of satisfactory computer response occurs.

FIG. 6 is another graph showing enlarged plots of a small portion of the sequences of pulses 100 and 102 illustrated in FIG. 5, including the Group skip pulses 104 associated with the pulses 100, and several corresponding signals produced at various points in the decoder/analyzer 20. A failure of satisfactory computer response to a discrete test is indicated by the absence of a System Fail Enabled pulse depicted in broken lines. Curve 106 shows the waveform of the signal at pin 1 of flip-flop 62 (FIG. 3) and curve 108 illustrates the waveform of the signal at pin 4 of nand gate 72. Curve 110 shows the waveform of the signal at pin 5 of nand gate 72, curve 112 that of the signal at pin 12 of nand gate 70, curve 114 that of the signal at pin 13 of nand gate 70, curve 116 that of the signal at pins 9 and 10 of nand gate 84, curve 118 that of the signal at pin 12 of flip-flop 62, curve 120 that of the signal at pin 2 of flip-flop 62, and curve 122 that of the signal at pin 5 of the one-shot 78.

In operation, computer selector switch 38 (FIGS. 1 and 4) is set to coincide with the type of computer to be tested. Cables 22 and 24 are connected to the appropriate test receptacles on the computer. Power is provided to the 5 volts d-c input terminals 48 only if the computer is not of the wire separated form. The test select switch on the computer is suitably set, and the test mode selector switch 40 (FIGS. 1 and 3) is set to its Continuous Step Count position 2 for initial discrete tests. On completion of the initial steps, the test mode selector switch 40 is set to its Stop On Failure position 1. Test sequencing will continue with each discrete test number displayed on the Pulse Step Count counter means 30 until a failure occurs, if any. When a failure occurs, the number of the discrete test can be noted and the sequencing continued by momentarily depressing the fail reset/step increment pushbutton switch 42, or the trouble can be isolated by use of the break-out test points provided by the two sets 26 and 28 of taper pin blocks and corrected before continuing the test sequencing.

Referring jointly to FIGS. 3 and 6, when there is a failure in computer test response, there is a lack of coincidence of the pulses 100 and 102 so that pin 1 of flip-flop 62 (curve 106) remains high in potential. Pin 4 of nand gate 72, pin 12 of nand gate 70 and pin 5 of one-shot 78 will respond to the pulse 100 as illustrated by the curves 108, 112 and 122, respectively. The signal (curve 112) at pin 12 of nand gate 70 and the delayed signal (curve 114) at pin 13 thereof produces the signal (curve 116) to pins 9 and 10 of nand gate 84. The inverted signal (curve 118) is applied to clock pin 12 of the flip-flop 62. Since pin 1 of flip-flop 62 is at a high potential (curve 106), the flip-flop is triggered so that its output signal (curve 120) goes low. This signal condition on test stop lead 58 stops the test sequencing of the computer under test. Test sequencing can be continued by depressing the fail reset/step increment switch 42 which resets the flip-flop 62.

The signal (curve 122) at input pin 5 of the one-shot 78 goes high at the trailing edge of the step counter clock pulse 100 and triggers the one-shot. The output signal (curve 110) from the one-shot 78 is applied to pin 5 of nand gate 72. Since this signal is low, both pins 4 and 5 of the nand gate 72 are made low to produce a delayed high signal (curve 114) to pin 13 of nand gate 70. The signal (curve 112) on pin 12 of nand gate 70 is also held low by the output signal (curve 110) from the one-shot 78 for the duration of such output signal. Thus, the three Group Skip pulses 104 following the Step Counter Clock pulse 100 cannot render pin 12 of nand gate 70 high along with pin 13 thereof to produce a necessary low signal from output pin 11 for inverting and erroneous stepping of step counter 30 and possible triggering of flip-flop 62 if properly conditioned by nand gate 60.

When the test mode selector switch 40 (FIG. 3) is placed in its Continuous Step Count position 2, the output pin 2 of flip-flop 62 is disconnected from test stop lead 58 so that a low ground signal cannot be provided to the computer to stop its test sequencing. The clear or reset pin 13 of flip-flop 62 is, however, connected through diode 66 to step counter clock lead 54 which is normally at a low potential except when a Step Counter Clock pulse 100 is present. Thus, in the second position of the test mode selector switch 40, the flip-flop 62 is automatically reset after each Step Counter Clock pulse and the computer is not stopped in its test sequencing on any failure of a discrete test.

When the test mode selector switch 40 is placed in its Manual Increment position 3, the pin 1 of nand gate 60 is disconnected from the system fail enabled lead 56 and connected to ground. This is, of course, equivalent to producing a continuous failure condition of all of the discrete tests so that test sequencing is stopped after each discrete test and the fail reset/step increment pushbutton switch 42 must be depressed each time to resume test sequencing. Thus, in the third position of the test mode selector switch 40, computer test sequencing can be stepped through manually as desired with the fail reset/step increment switch 42.

While an exemplary embodiment of this invention has been described above and shown in the accompanying drawings, it is to be understood that such embodiment is merely illustrative of, and not restrictive on, the broad invention and that we do not desire to be limited in our invention to the specific arrangements, circuits or constructions described or shown, for various modifications may occur to persons having ordinary skill in the art.

We claim:

1. For use with a computer including built in test equipment for subjecting said computer to a sequence of discrete tests, said computer providing a discrete test initiating signal and a corresponding discrete test satisfactory signal when test response of said computer to each discrete test is correct, and said computer being responsive to a test stop signal to halt test sequencing of said computer, a test unit comprising:

means for comparing for coincidence of said discrete test initiating signal and said discrete test satisfactory signal corresponding thereto, said comparing means providing a test stop signal for halting test sequencing of said computer upon a lack of coincidence of said discrete test initiating signal and said discrete test satisfactory signal normally corresponding thereto;

step counter means for counting said discrete tests and indicating the particular discrete test that said computer is undergoing; and means for processing said discrete test initiating signal and providing a processed signal to step said counter means.

2. The invention as defined in claim 1 wherein said discrete test initiating signal is provided from said computer on a first lead to said comparing means of said test unit, said discrete test satisfactory signal is provided from said computer on a second lead to said comparing means of said test unit, and said test stop signal is provided from said comparing means of said test unit on a third lead to said computer, and further comprising first means for indicating the existence of said discrete test initiating signal to said test unit and first means connecting said first indicating means to said first lead whereby said first indicating means is activated when said discrete test initiating signal exists on said first lead, second means for indicating the existence of said discrete test satisfactory signal to said test unit and second means connecting said second indicating means to said second lead whereby said second indicating means is activated when said discrete test satisfactory signal exists on said second lead, and third means for indicating the existence of said test stop signal from said comparing means of said test unit and third means connecting said third indicating means to said third lead whereby said third indicating means is activated when said test stop signal exists on said third lead.

3. The invention as defined in claim 1 further comprising means for providing a fast advance signal to said computer to speed up test sequencing thereof.

4. The invention as defined in claim 1 further comprising means for resetting said counter means.

5. The invention as defined in claim 1 wherein said discrete test initiating signal is associated with at least one following control signal, said discrete test initiating signal and said at least one control signal being provided from said computer on a lead to said comparing means of said test unit, and further comprising means for inhibiting said at least one control signal from affecting operation of said test unit, said inhibiting means including an input and an output, and means connecting said inhibiting means input to said lead and said inhibiting means output to said comparing means of said test unit whereby said inhibiting means is responsive to said discrete test initiating signal to prevent said comparing means from erroneously responding to said at least one control signal and providing said test stop signal.

6. The invention as defined in claim 1 wherein said comparing means includes a comparator device having said discrete test initiating signal and said discrete test satisfactory signal applied thereto and producing an output signal when said discrete test initiating signal coincides with said discrete test satisfactory signal, and a control device having a conditioning input, a triggering input and an output for providing said test stop signal, said comparator device output signal being applied to said control device conditioning input and said processed signal provided by said processing means being applied to said control device triggering input, said control device being triggered by said processed signal to provide said test stop signal at said control device output when said comparator device output signal is being applied to said control device conditioning input.

7. For use with a computer including built in test equipment for subjecting said computer to a sequence of discrete tests, said computer providing a discrete test initiating signal and a corresponding discrete test satisfactory signal when test response of said computer to each discrete test is correct, and said computer being responsive to a test stop signal to halt test sequencing of said computer, a test unit comprising:

a comparator device having said discrete test initiating signal and said discrete test satisfactory signal applied thereto, and producing an output signal when said discrete test initiating signal coincides with said discrete test satisfactory signal;

means for processing said discrete test initiating signal, and producing a processed signal therefrom;

a control device having a conditioning input, a reset input, a triggering input and an output for providing a test stop signal for halting test sequencing of said computer, said comparator device output signal being applied to said control device conditioning input, and said processed signal produced by said processing means being applied to said control device triggering input, said control device being triggered by said processed signal to provide said test stop signal at said control device output when said comparator device output signal is being applied to said control device conditioning input; and means for producing a reset signal which can be applied to said control device reset input to reset said control device, when triggered, and remove said test stop signal at said control device output.

8. The invention as defined in claim 7 further comprising step counter means for counting said discrete tests and indicating the particular discrete test that said computer is undergoing, said processed signal from said processing means being applied to step said counter means.

9. The invention as defined in claim 7 wherein said discrete test initiating signal is provided from said computer on a first lead to said comparator device of said test unit, said discrete test satisfactory signal is provided from said computer on a second lead to said comparator device of said test unit, and said test stop signal is provided from said control device output of said test unit on a third lead to said computer, and further comprising first means for indicating the existence of said discrete test initiating signal to said test unit and first means connecting said first indicating means to said first lead whereby said first indicating means is activated when said discrete test initiating signal exists on said first lead, second means for indicating the existence of said discrete test satisfactory signal to said test unit and second means connecting said second indicating means to said second lead whereby said second indicating means is activated when said discrete test satisfactory signal exists on said second lead, and third means for indicating the existence of said test stop signal from said control device output of said test unit and third means connecting said third indicating means to said third lead whereby said third indicating means is activated when said test stop signal exists on said third lead.

10. The invention as defined in claim 7 wherein said discrete test initiating signal is associated with at least one following control signal, said discrete test initiating signal and said at least one control signal being provided from said computer on a lead to said processing means of said test unit, and further comprising means for inhibiting said at least one control signal from affecting operation of said test unit, said inhibiting means including an input and an output, and means connecting said inhibiting means input to said lead and said inhibiting means output to said processing means of said test unit whereby said inhibiting means is responsive to said discrete test initiating signal to prevent said processing means from erroneously responding to said at least one control signal and producing said processed signal to be applied to said control device triggering input.

* * * * *